July 2, 1963 P. W. McCOBB 3,096,130

STORAGE ARRANGEMENTS

Filed Dec. 4, 1959 6 Sheets-Sheet 1

INVENTOR.

Paul W. McCobb

BY

Michael S. Striker his attorney

July 2, 1963 P. W. McCOBB 3,096,130

STORAGE ARRANGEMENTS

Filed Dec. 4, 1959 6 Sheets-Sheet 2

INVENTOR.

Paul W. McCobb

BY

Michael Ebert his attorney

STORAGE ARRANGEMENTS

Filed Dec. 4, 1959 6 Sheets-Sheet 3

INVENTOR.
Paul W. McCobb
BY
Michael S. Striker
his attorney

INVENTOR.
Paul W. McCobb
BY
Michael S. Striker
attorney

INVENTOR.
Paul W. McCobb
BY
his attorney

July 2, 1963

P. W. McCOBB 3,096,130

STORAGE ARRANGEMENTS

Filed Dec. 4, 1959

6 Sheets-Sheet 6

INVENTOR.
Paul W. McCobb
BY
[illegible]
his Attorney 3,096,130
STORAGE ARRANGEMENTS
Paul W. McCobb, 139 E. 57th St., New York, N.Y.
Filed Dec. 4, 1959, Ser. No. 857,351
5 Claims. (Cl. 312—111)

The present invention relates to storage arrangements.

It is usual in most homes and offices to find a situation where there is inadequate storage. This is true even of relatively new homes. However, when one sets about to increase storage facilities, it is found that considerable expense is involved and in most cases it is necessary to go to the trouble of having special structure made for a particular purpose as well as for a particular room.

It is a primary object of the present invention to provide a storage arrangement which is of extreme flexibility with respect to its capability to adapt itself to any conditions both with respect to location as well as with respect to the intended use of the storage structure.

It is also an object of the present invention to provide a storage arrangement wherein relatively small number of basic structures are used repeatedly in any desired combination to form a storage apparatus suited for a particular purpose and a particular location.

It is a further object of the present invention to provide a storage apparatus made up of coordinated storage units which can be conveniently distributed throughout an entire home, for example, while blending into the decorative scheme of the rooms and while at the same time providing maximum convenience and maximum storage space in a minimum area.

It is also an object of the invention to provide a structure which can be arranged either along a wall of a room or which can, if desired, be arranged as an island spaced from the walls of the room.

The objects of the present invention also include a means for arranging the storage units with respect to each other in such a way that the strongest possible assembly of units is provided.

It is a further object of the present invention to provide a structure of the above type with components such as handles, hinges, electrical connections, mop guards, and the like which neatly blend into the remaining structure while providing the desired construction in a highly reliable manner without necessitating the use of specially constructed elements so that the same handles, hinges, etc. can be used throughout the apparatus.

With the above objects in view the present invention includes in a storage arrangement a plurality of coordinated storage units capable of being assembled together in any desired combination so as to provide a storage assembly which is particularly suited for a given location as well as for a given purpose.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 19:
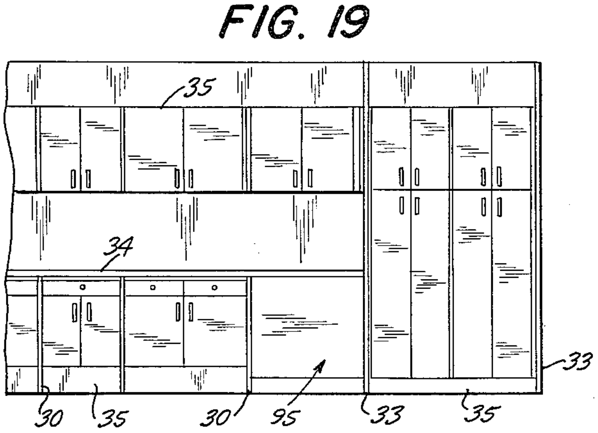
Figures 20, 21:
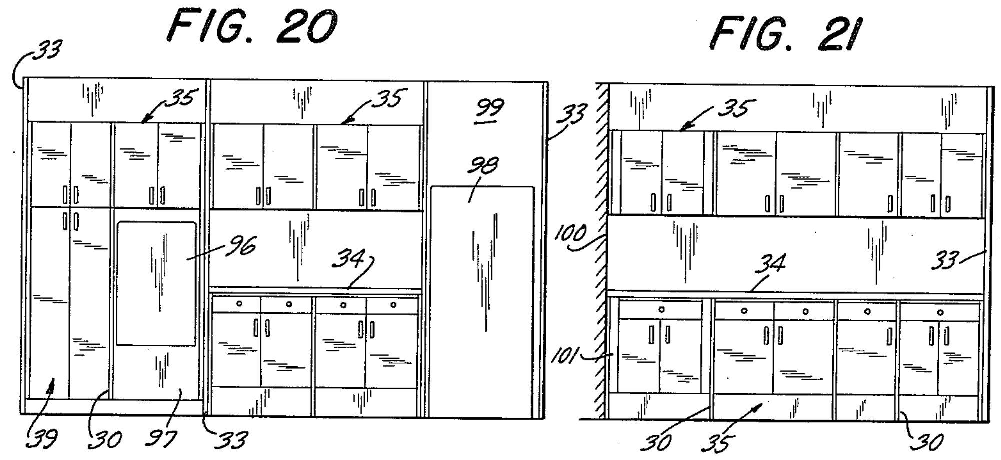
Figure 23:
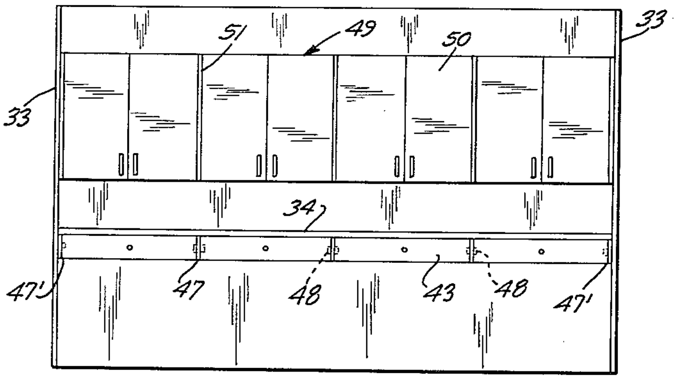
Figure 22:
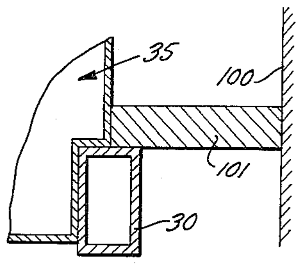
Figure 24:
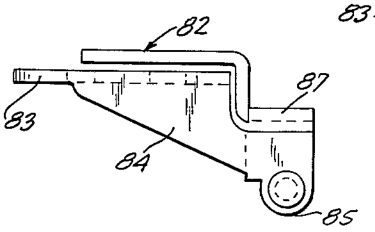
Figure 25:
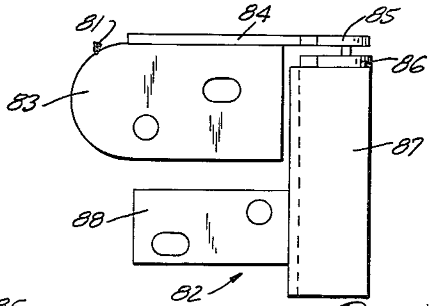

FIG. 19 diagrammatically illustrates another typical storage arrangement particularly suited for the incorporation of an electrical appliance or the like into the construction;

FIG. 20 is also a diagrammatic illustration of a typical storage arrangement according to the present invention, the structure of FIG. 20 being combined with large appliances such as an oven and refrigerator;

FIG. 21 illustrates yet another typical storage arrangement according to the invention;

FIG. 22 is a fragmentary sectional plan showing the relationship between a wall and the storage arrangement of the invention;

FIG. 23 is a diagrammatic elevation of still another typical storage arrangement capable of being put together with the units of the invention;

FIG. 24 is a top plan of hinge used to support the doors of the cabinets or closets of the invention; and FIG. 25 is a front elevation of the structure of FIG. 24.

Figures 1, 2, 3, 4:
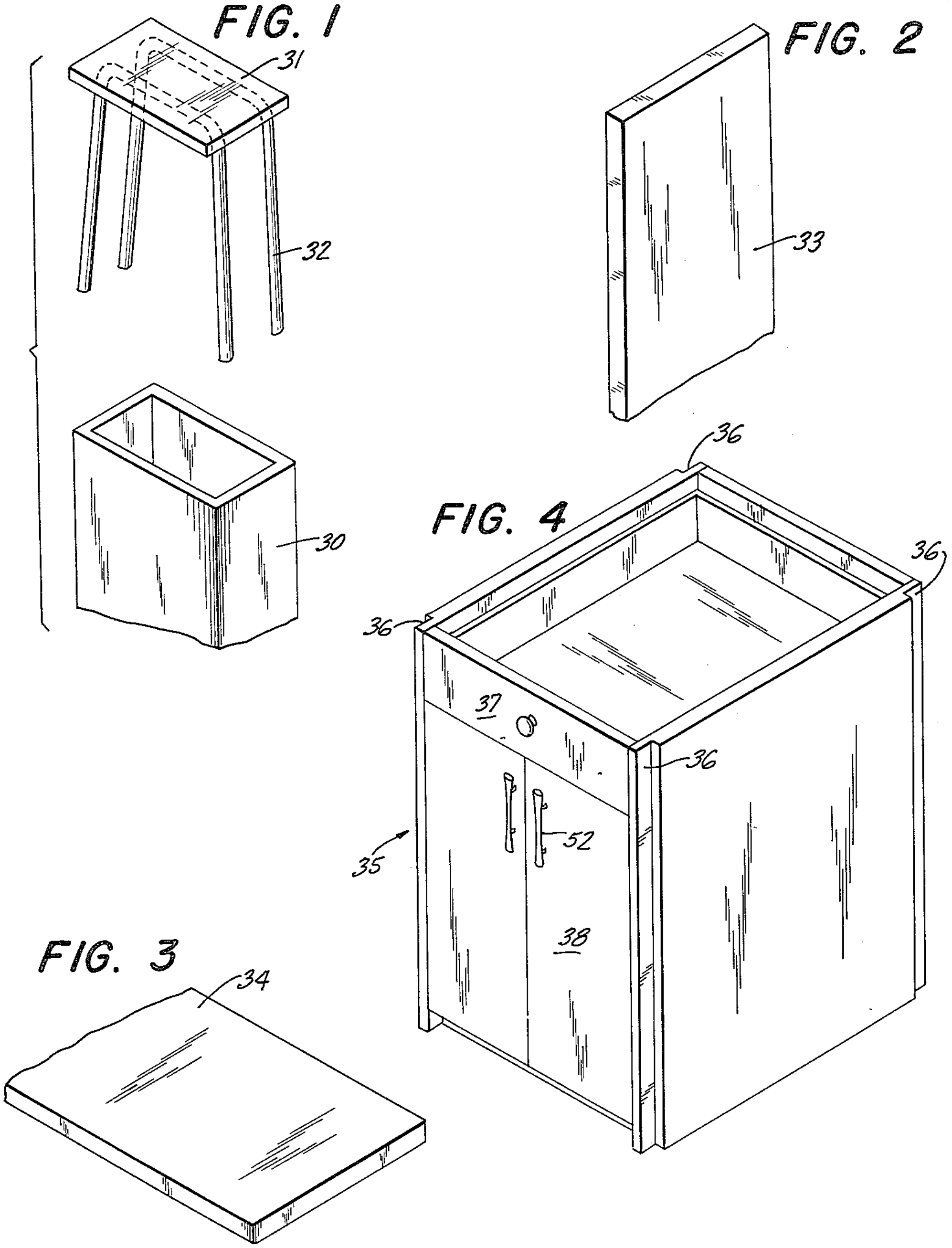
FIG. 1 is a fragmentary perspective illustration of part of an elongated hollow extrusion forming one of the basic elements used repeatedly throughout the structure of the invention, FIG. 1 also showing a plate capable of closing the end of the hollow extrusion.
FIG. 2 is a fragmentary perspective of a panel which also forms one of the basic elements used repeatedly throughout the storage structure of the invention.
FIG. 3 is a fragmentary illustration of part of a counter top which forms another of the elements used repeatedly throughout the structure of the invention.
FIG. 4 is a perspective illustration of a cabinet unit.

Referring to FIG. 1, there is illustrated therein an elongated hollow extrusion 30 made of aluminum, for example, and used in a manner described below in the structure of the invention. The extrusion 30, instead of being made of aluminum, may be made of steel which is plated at its exterior with chromium, nickel, alloys thereof, or the like. The extrusions 30 may come in any desired convenient lengths. Also shown in FIG. 1 is a plate 31 forming part of a closure for the open end of the extrusion 30, this plate 31 having fixed to its underside, as viewed in FIG. 1, in any suitable way as by welding, for example, a pair of U-shaped elements 32 having springy legs diverging from each other and capable of being inserted into the hollow interior of the extrusion 30 at the top end thereof, as viewed in FIG. 1, for example, the free ends of the springy legs 32 being spaced apart from each other by a distance greater than the opposed inner surfaces of the extrusion 30 so that these free ends will press against the inner surface of the extrusion 30 to maintain the cap 31 in its position closing the end of the extrusion 30.

FIG. 2 fragmentarily illustrates a panel 33 in the form of a slab of wood, for example, of rectangular configuration having a height which approximates the distance between the floor and ceiling of a room and having any convenient thickness of between 1 and 2 inches, for example.

FIG. 3 illustrates a part of a counter top 34 used with the structure of the invention in a manner described below, this counter top also having any convenient width and thickness and having a top layer of a suitable hard plastic such as formica or the like. The counter top 34 comes in any prescribed length according to the particular circumstances, as described below.

FIG. 4 illustrates a cabinet unit which forms one of the storage units of the invention, the cabinet unit 35 having four corners each of which is formed along its entire length with an elongated notch 36, in accordance with the present invention. In the particular cabinet unit 35 illustrated in FIG. 4 there is a single drawer 37 as well as a pair of doors 38 behind which is located any desired arrangement of shelves. All of the cabinet units 35 of the invention have the same general exterior configuration as the cabinet unit 35 shown in FIG. 4, but they may have any desired combination of drawers and doors. For example, they may be composed of drawers only, if desired, or they may be composed entirely of doors 38.

Figures 5, 6:
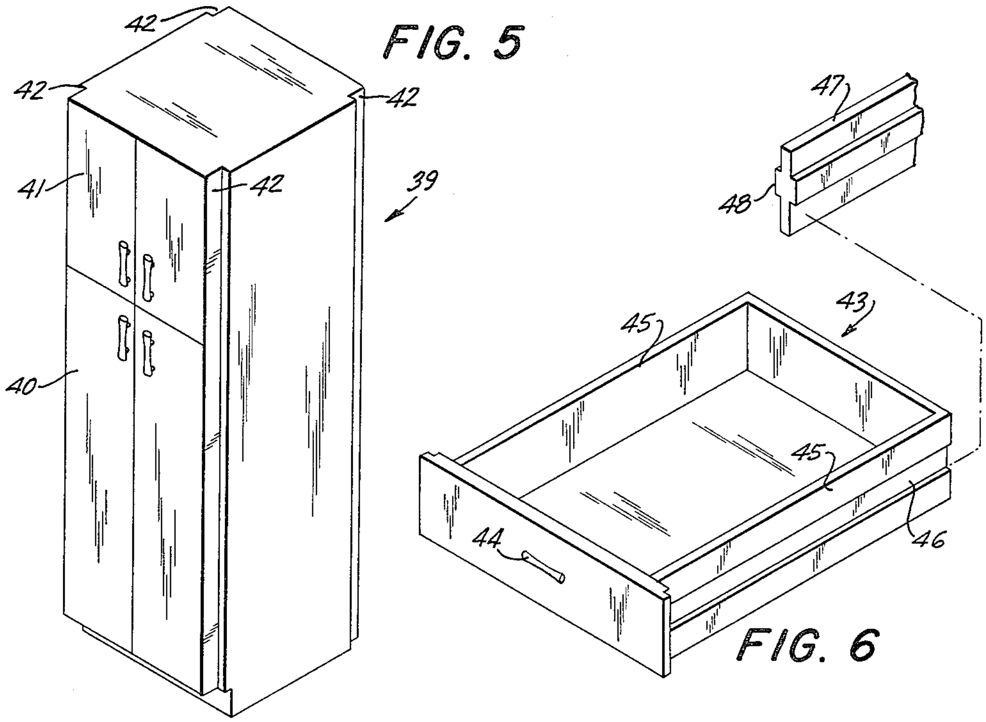
FIG. 5 is a perspective view of a closet unit.
FIG. 6 is a perspective view of a drawer unit as well as of a guide for the drawer unit.

FIG. 5 illustrates a closet unit 39 of the invention. All of the closet units 39 used throughout the structure of the invention are also of the same general configuration and size. In the particular closet unit 39 shown in FIG. 5 there are a pair of lower doors 40 and a pair of upper doors 41, with a partition located between the upper and lower pairs of doors so as to provide a pair of spaces arranged vertically one above the other within the closet unit 39, but it is also possible to provide only one pair of doors extending throughout the entire height of the closet unit. It will be noted that at its four corners the storage unit 39 of FIG. 5 is also formed with elongated notches 42 extending throughout the length of the four corners for a purpose described below, so that while the storage units 35 and 39 differ as to height, for example, they are identical with respect to the notches extending along the corners thereof.

FIG. 6 illustrates a drawer 43 forming another storage unit of the invention. The drawer 43 has any suitable pull 44 and its sides 45 are formed with the guiding grooves 46. A plurality of guide members 47 are arranged between the successive drawers which are located beside each other at the same elevation and these members 47 are provided with ribs 48 respectively cooperating with the grooves 46 to guide the drawers. A row of the members 47 may be fixed, for example, beneath a counter top 34 and the drawers may be located between and supported by the members 47 on the ribs 48 thereof for opening and closing movement.

For example, referring to FIG. 23, it will be seen that a pair panels 33 are illustrated therein with a counter top 34 extending between and fixed at its ends to these panels 33. The panels 33 rest at their bottom end on the floor of a room and extend forwardly from a wall of the room with the rear edges of the panels 33 fixed to this wall. The top ends of the panels 33 may be located at and fixed to the ceiling or the top ends of the panels 33 may terminate beneath the ceiling at any desired distance therefrom. As may be seen from FIG. 23, a series of guide members 47 are fixed to the underside of the counter top 34 in any desired manner and a series of drawers 43 are located between the guide members 47 beneath the counter top 34. The end guide members 47′ will have their outer ribs 48 removed so that they can be located flush against the side surfaces of the panels 33.

FIG. 23 also shows a series of cabinet units 49 identical with the cabinet units 35 except that the units 49 are provided only with doors 50 extending throughout the height of the units. When the units 49 are arranged in a row between the panels 33, as illustrated in FIG. 23, they will have at their front corners pairs of notches directed toward each other at each of the adjoining corners of a pair of successive units 49, and elongated divider elements 51 are located in each pair of notches filling the latter and fixed to the pair of successive cabinet units 49 so that the row of cabinet units 49 are fixed to each other in this way. The divider elements 51 are formed by cutting suitable lengths of the extrusion 30 of FIG. 1 and the notches such as the notches 36 of FIG. 4 and the notches 42 of FIG. 5 have a size which is adapted to the extrusion 30 so that the latter will fit into these notches while extending slightly forwardly from the front of the storage units. The divider elements 50 are also located at the end units 49 and fixed to the panels 33.

Thus, it will be seen that FIG. 23 forms one typical assembly made by combining together given lengths of the extrusion 30 of FIG. 1, a pair of the panels 33 of FIG. 2, a series of cabinet units 49 of the same general construction as the cabinet unit 35 of FIG. 4, a series of the drawer units 43 and guide members 47 of FIG. 6, and a suitable length of counter top 34 of FIG. 3. The depth of the units 49 will be considerably less than the width of the counter top 34 and the depth of the drawers 43, the term "depth" signifying the distance from the front to the rear of the cabinet units and the drawers, and the panels 33 will extend forwardly beyond the cabinet units 49, the latter being located flush against the wall.

Figure 7:
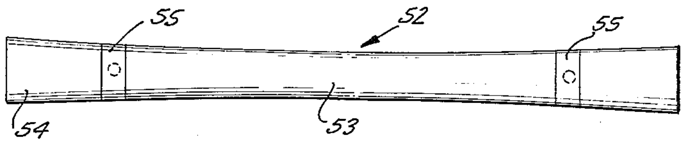
FIG. 7 illustrates a handle of the invention as seen when looking toward the front of the handle.
Figure 8:
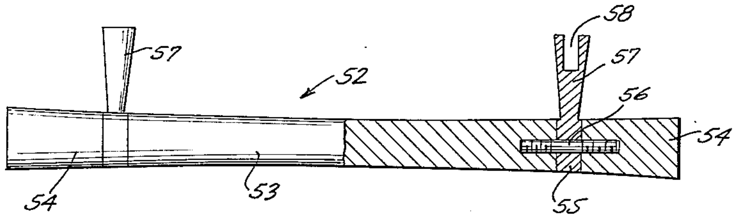
FIG. 8 is a top plan view of the structure of FIG. 7 with the right hand portion of FIG. 8 being illustrated in section.

As may be seen by referring to the cabinet units of FIG. 23 as well as the doors of the storage units of FIGS. 4 and 5, the same handle is used throughout the construction of the invention on all of the doors as well as on all of the drawers, except when these drawers are of a relatively small size. The details of the handle of the invention are shown in FIGS. 7 and 8. Referring to FIGS. 7 and 8, it will be seen that handle 52 of the invention includes an elongated intermediate member 53 and a pair of end members 54 coaxial with and spaced from the intermediate member 53. A pair of eyes 55 are located between the end members 54 and the intermediate member 53 against the end faces of the latter as well as against the inner end faces of the end members 54, and a pair of studs 56 threadedly carried by the intermediate member 53 extend respectively through and beyond the eyes 55 into threaded engagement with the end members 54, respectively. A pair of extensions 57 are fixed integrally with the eyes 55 and extend therefrom, these extensions 57 being formed with suitable threaded openings 58 so that by the use of suitable screw members the handle may be fixed to any desired door or drawer. The components of the handle of the invention are extremely easy to assemble since it is only required to thread the end members onto the studs 56 after the latter have been passed through the eyes 55 in order to provide a complete handle assembly as shown in FIGS. 7 and 8, and it will be noted that the handle 52 of the invention is generally of an hourglass configuration. The intermediate member 53 and the end members 54 are prefereably made of a nonmetallic material such as any hard wood or plastic, while the eyes 55 and extensions 57 may be made of any suitable metal.

Figure 9:
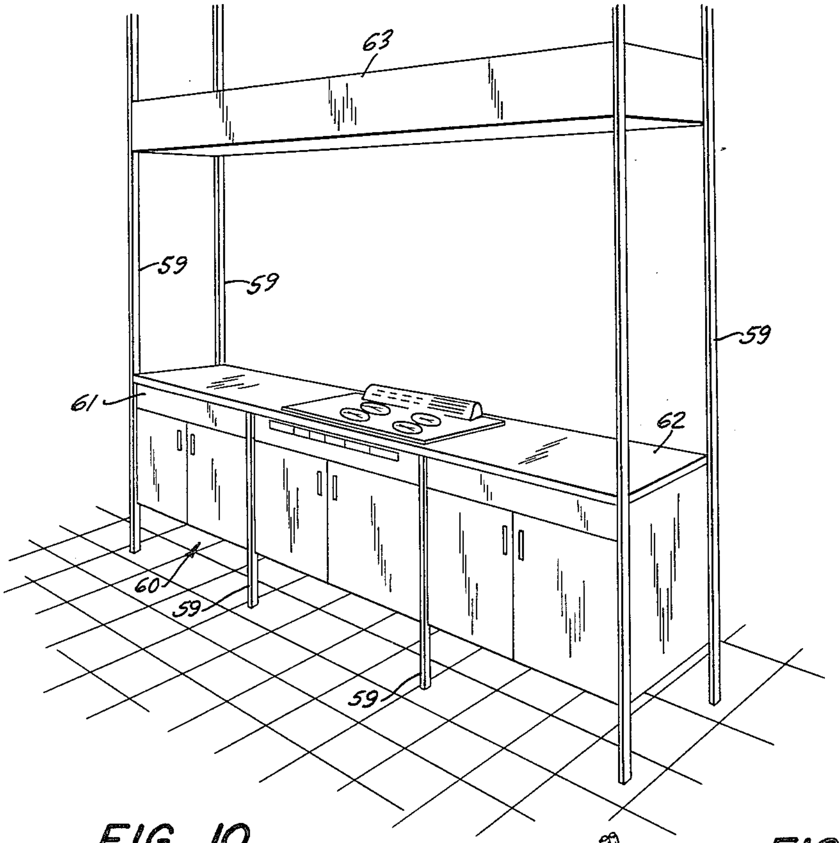
FIG. 9 illustrates an island formed by combining several of the basic units of the invention.

FIG. 9 illustrates an island storage arrangement according to the invention, the assembly of FIG. 9 being spaced from the walls of the room and forming an island in the room. In the illustrated example, the island unit of FIG. 9 forms a part of a kitchen where the cooking range, for example, is located. The island assembly of FIG. 9 includes a plurality of elongated elements 59 all of which are formed by cutting suitable lengths of the extrusion 30 of FIG. 1. It will be noted that the four corner elements 59 extend all the way from the floor to the ceiling, although they may terminate short of the ceiling, if desired. In the illustrated example three coordinated cabinet units 60 are joined together in a row, these units 60 being substantially the same as the cabinet units 35 of FIG. 4. The cabinet units 60 differ from the cabinet 35 of FIG. 4 only in that instead of an upper drawer 37, these units are provided with panels 61 providing a free space in the upper portion of the units behind the panels 61 adapted to accommodate any desired devices. Behind the panel 61 of the central unit 60 of FIG. 9 is located an electric cooking range.

It will be noted that the extrusion lengths 59 are located in the notches at the corners of the several cabinet units 60 and extend downwardly beyond the units 60 to the floor, so that the elements 59 will simultaneously serve as legs for the cabinet unit 60. Furthermore, the elements 59 serve to space the units 60 from each other and to connect them together, inasmuch as the elements 59 are fixed to the units 60 in a manner described below. A continuous counter top 62 extends over all of the units 60 of FIG. 9, this counter top being the same as the counter top 34 of FIG. 3 and delivered in a suitable length to cover the several units 60 of FIG. 9, and of course at a central portion the counter top 62 is formed with an opening to receive the electrical cooking unit.

The four corner elements 59 may be connected adjacent their top ends to a lamp assembly 63 which will illuminate the island assembly of FIG. 9.

In accordance with the invention, the elongated hollow extrusions 30 used in the case of FIG. 9 to form the elements 59 serve the additional function of housing electrical leads so that these leads may be connected to any electrical devices and at the same time will not be exposed so that the tubular extrusions of the invention serves to protect the electrical wiring.

Figure 10:
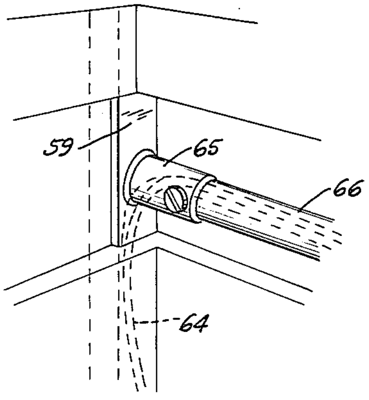
FIG. 10 is a fragmentary illustration on an enlarged scale of structure for connecting an electrical device to a source of current.
Figure 11:
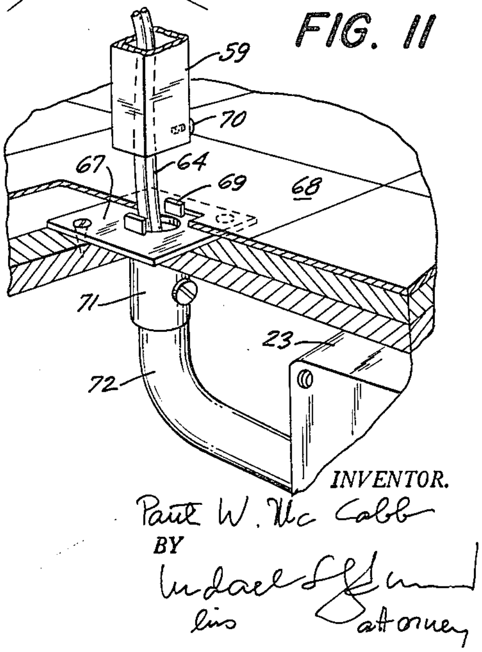
FIG. 11 is a fragmentary view on an enlarged scale showing also part of the structure of FIG. 9 to illustrate how an electrical device is connected to the source of electricity.

As may be seen from FIG. 10, the electrical wiring 64 extends through one of the hollow extrusions 59 and beneath the top 62 of one of the cabinet units a tubular extension 65 is connected to and communicates with the interior of the extrusion 59, this extension 65 being connected with a conduit 66 extending to the applicance such as the cooking range of FIG. 9 so that in this way the lead 64 can extend from the interior of one of the hollow extrusions 59 through the extension 65 and conduit 66 to the electrical device. Of course, the structure shown in FIG. 10 is not visible from the exterior of the island assembly of FIG. 9 and the extension 65 and conduit 60 are located behind a wall of the extrusion 59 of FIG. 10 before it is joined to the floor of the room. At this point a plate 67 is fixed to the floor beneath the tiles 68 or other floor covering, and the plate 67 is formed with a central opening 68 as well as with a pair of upstanding tongues 69. The distance between the tongues 69 corresponds to the inner dimension of the extrusion 59 so that the latter can be lowered from the position illustrated in FIG. 11 downwardly onto the plate 67 with the tongue 69 located in the interior of the extrusion 59 against opposed inner surfaces thereof, and then a pair of set screws 70 can be threaded against the tongues 69 so as to fix the element 59 of FIG. 11 in the desired position. A tubular extension 71 of the plate 67, this extension communicating with the opening 68, is fixed to a conduit 72, and the electrical leads 64 extend through the opening 68 and extension 71 along the hollow conduit 72 to the outlet box 73 located beneath and fixed to the floor and connected in a known way to the lines.

Figures 12, 13, 14, 16:
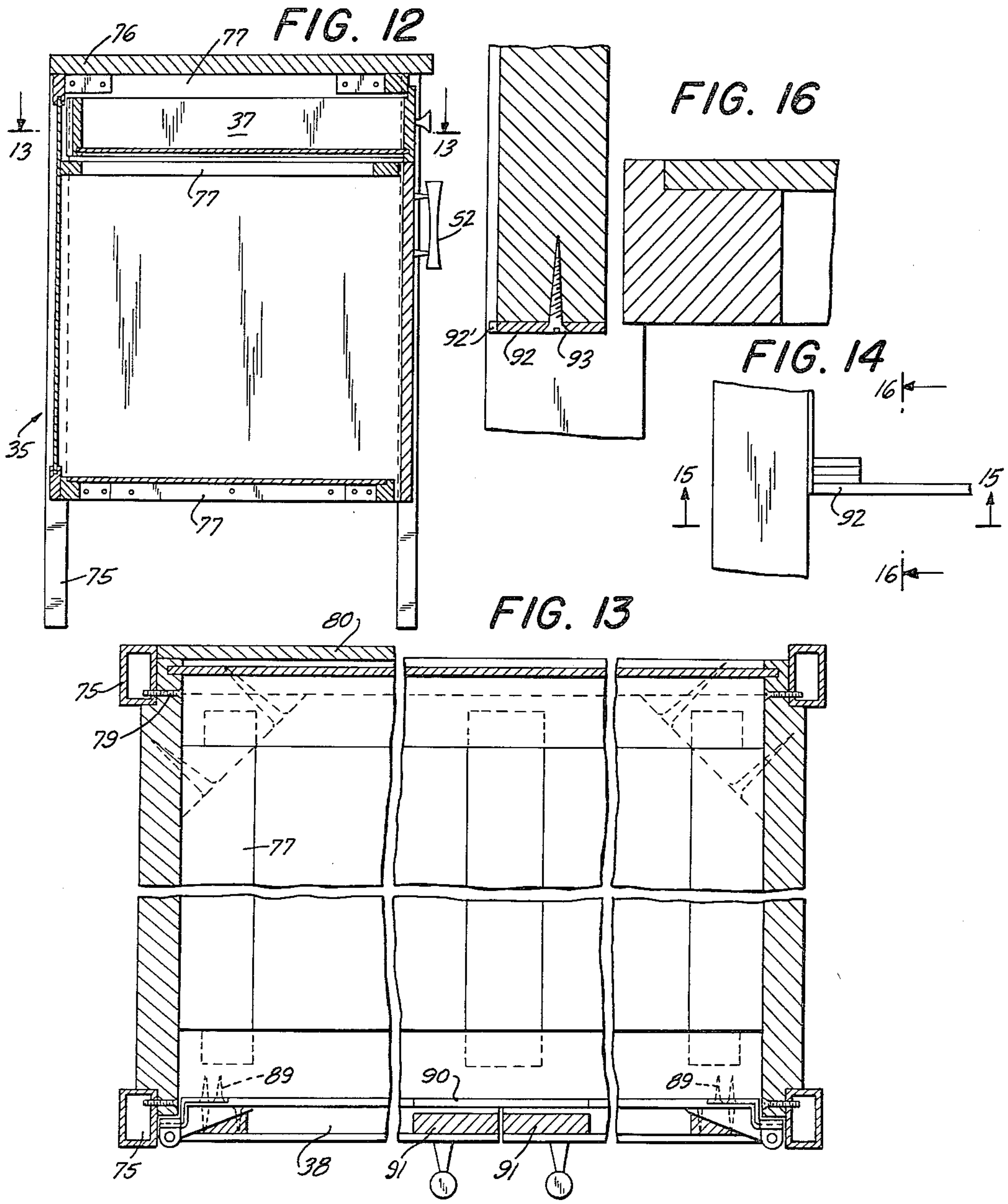
FIG. 12 is a sectional side view of a cabinet unit together with the legs which support the same.
FIG. 13 is a sectional plan taken along line 13—13 of FIG. 12 in the direction of the arrows.
FIG. 14 is a fragmentary front view of part of a cabinet unit illustrating a mop guard.
FIG. 16 is a view taken along line 16—16 of FIG. 14 in the direction of the arrows.

FIG. 12 shows in a side section the cabinet unit 35 supported on lengths 75 of the extrusion 30 of FIG. 1, these lengths 75 being located in the notches 36 and fixed to the cabinet unit 35. Also the cabinet unit 35 is shown in FIG. 12 covered at its top end by a portion 76 of a counter top 34. It will be noted that the extrusion lengths 75 extend to the floor downwardly beyond the unit 35 to form legs for the latter. FIG. 12 also shows one of the handles 52 of the invention connected to one of the doors 38. Also, the drawer 37 is shown in FIG. 12. The cabinet is provided with three horizontal frames 77 of rectangular configuration located between and fixed to the side walls of the cabinet, these frames being placed respectively at the top and bottom of the cabinet with one of the frames located between the upper and lower frames and adjacent the top frame so as to form a support for the drawer 37.

As may be seen from FIG. 13, each of the frames 77 is fixed at its rear corners to a triangular corner block 78 which is screwed to the side walls of the cabinet unit. When the drawers and shelves are removed from the cabinet unit the side walls thereof are fixed by self-tapping screws 79 to the hollow extrusions 75, these screws 79 being distributed along the extrusions 75. In the case where the cabinet units will have exposed rear walls, as in the case of FIG. 9 where they are used to form an island assembly, the rear walls will be covered by a suitable panel 80 (FIG. 13) of plywood or the like glued to the rear of the cabinet unit.

The doors 38 are in the form of hollow plywood frames and they are supported by special hinges which enable these doors to turn between their open and closed positions without interference from the hollow divider elements 75 which extend forwardly beyond the doors through a relatively slight distance, as is evident from FIG. 13. The hinge structure is illustrated in FIGS. 24 and 25 from which it may be seen that each hinge includes a plate portion 81 and a plate portion 82. The plate portion 81 has a leaf 83 adapted to be fixed by screws or the like to the inner face of a door 38, and this part 38 of the plate portion 81 is fixed at its top to a triangular portion 84 extending along the top edge of the door or along the bottom edge of the door, a pair of hinges being located at the top and bottom of the outer edge of each door. The triangular portion 84 terminates in a forwardly extending ear 85, and this ear 85 is located over and pivotally connected to an ear 86 of the plate portion 82, this ear 86 extending forwardly from the top end of a downwardly directed part 87 which at its left edge, as viewed in FIGS. 24 and 25 extends rearwardly to the leaf portion 88 which extends parallel to the leaf portion 83 while being located somewhat to the rear thereof. Thus, the leaf 88 can be fixed, as by the screws 89 shown in FIG. 13 to the stationary frame of the cabinet, while the leaf 83 is fixed to the door 38, the particular hinge shown in FIGS. 24 and 25 being a right hinge which is shown at the right in FIG. 13. It will be seen that in this way the forwardly extending overlying pivotally interconnected ears 85 and 86 provide each door with a turning axis located sufficiently near to the front edge of the extrusions 75 to enable the doors to open and close without interference from these extrusions.

Any desired shelves, partitions, or the like can be located within the cabinet unit 35 between the lower and intermediate horizontal frames 77 thereof and behind the doors 38 thereof.

Referring to FIG. 13, the frame 77 shown therein, which is the intermediate frame of FIG. 12, carries at its front edge overlapping the adjoining side edges of the doors 38 a magnetic strip 90 made of any magnetic material, and within the hollow frames which form the doors 38 are respectively located a pair of magnetic members 91 fixed to the doors, respectively, and located at the elevation of the magnetic plate 90. The elements 91 are permanent magnets, although, if desired, the element 90 may be a permanent magnet, and with this arrangement the magnets will be attracted to the element 90 so as to hold the doors in a closed position. The doors are opened simply by pulling the magnets 91 away from the magnetic element 90, which does not require too great of a force, but at the same time the magnetic structure will reliably hold the doors in their closed positions. These same door closure devices may be applied to the doors of the closet units 39, one of which is shown in FIG. 5.

Figure 15:
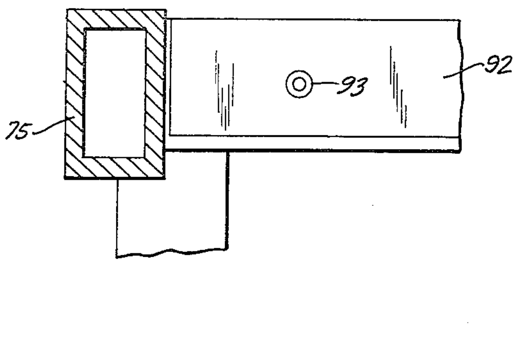
FIG. 15 is a view taken along line 15—15 of FIG. 14 in the direction of the arrows.

Referring to FIG. 14, it will be seen that the door 38 fragmentarily illustrated in FIG. 14, this door actually forming the front wall of the cabinet unit, has fixed to its lower edge a strip 92 of aluminum, for example. This strip 92 is fixed to the lower edge of each door 38 by any suitable devices such as the screws 93 shown in FIG. 15, and as may be seen from FIG. 16, the strip 92 has a free edge 92' extending forwardly beyond the front face of the doors 38. Thus, when a mop, broom, or the like is applied to the floor of the room, this mop, broom or the like will have its handle striking against the free edge 92' of the strip 92, so that this strip forms a mop guard preventing marring of the structure of the invention. The strip 92 may be made of aluminum, for example. It is shown in FIGS. 14–16 applied to a door 38, since this is the front wall of the cabinet unit extending to the bottom-most part thereof. However, in the case of the cabinet unit which is provided only with drawers, for example, and which has a lower stationary edge or a lower drawer edge forming the lowermost part of the front wall of the cabinet unit, this strip will of course be fixed to such a lower edge. The mop guard is always fixed to the lower front edge of the storage unit.

Figure 17:
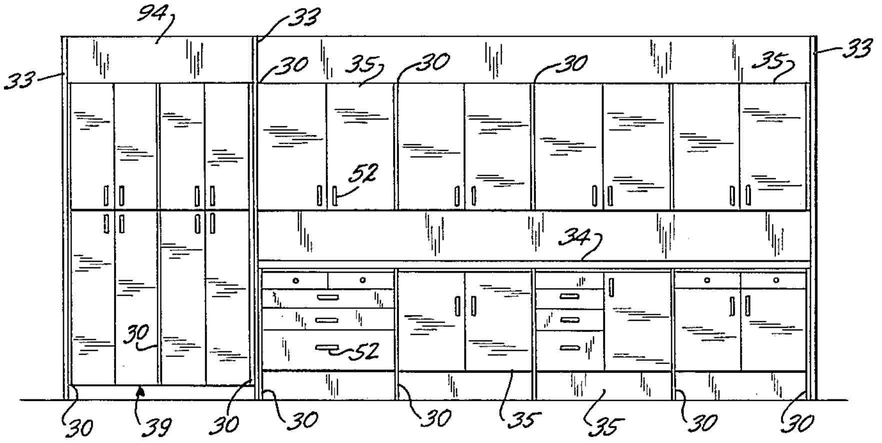
FIG. 17 illustrates one typical storage arrangement according to the invention.
Figure 18:
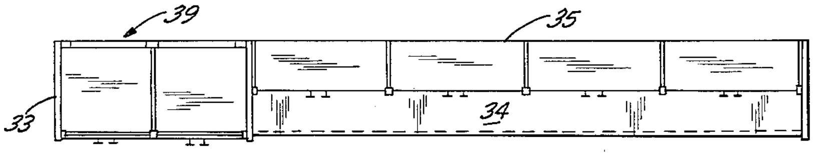
FIG. 18 is a top plan view of the structure of FIG. 17.

FIGS. 17 and 18 illustrate one of the many possible combinations of the basic structures of the invention. Thus, starting from the left of FIG. 17 it will be seen that there is a panel 33 followed by an elongated extrusion 30 connected to a closet unit 39, this left closet unit 39 being connected to and separated from the right closet unit 39 of FIG. 17 by a second extrusion 30, and then a third extrusion is located between the right closet unit 39 of FIG. 17 and the intermediate panel 33. The space between the ceiling and the top of the closet units 39 may be left open or, if desired, any panel 94 may be located in this space. Between the intermediate panel 33 and the right panel 33 of FIG. 17 are located an upper series of cabinet units 35, and it will be noted that these units are provided only with doors behind which are shelves and they do not have any drawers. Extrusions 30 are located between the successive units 35 as well as between the end units 35 and fins 33. Below the upper units 35 of FIG. 17 is located a series of lower cabinet units 35 which have many different combinations of drawers and doors, as shown in FIG. 17, and a common counter top 34 extends across the tops of all of the lower units 35 and is connected at its ends to the right panel 33 and the intermediate panel 33 of FIG. 17. It will be noted that in the case of the lower units 35 the several extrusions 30 not only serve to separate these units so that the extrusions 30 act as divider elements, but in addition the units 30 extend downwardly beyond the lower units 35 to the floor, so that these extrusions 30 serve as legs which support the lower series of units 35. The front lower edges of these units 35 may be provided with mop guards, as referred to above.

As is apparent from the plan view of FIG. 18, the upper units 35 have a lesser depth than the lower units 35 so that the counter top extends forwardly beyond the upper units 35. Thus, it is seen that with the relatively small number of basic units of the invention it is possible to provide any desired combination of coordinated storage units adapted to any particular location and purpose. It will be seen that the basic elements which are combined to form an arrangement such as that shown in FIGS. 17 and 18 are actually divided into two groups. Thus, there is the group of storage units composed of the closet units 39 and cabinet units 35, and, if desired, the drawer units 43 of FIG. 6; and in addition there is the group of connecting and supporting units composed of the panels 33, the extrusion 30, and the counter top 34. With this small number of elements it is possible to provide any desired combination of storage units in a coordinated manner.

FIG. 19 shows an arrangement of closet units 39, cabinet units 35, panels 33, and extrusion 30 similar to that of FIG. 17. However, FIG. 19 shows how the structure of the invention is adapted to accommodate an appliance 95 which may be any desired applicance such as, for example, a dishwasher. Thus, it is seen from FIG. 19 that all that is required is to leave between the left panel 33 of FIG. 19 and the extrusion 30 connected to the lower right unit 35 a space beneath the counter top 34 large enough to accommodate the appliance 95, so that in the simplest possible way this appliance 95 can be incorporated into the arrangement of the invention.

FIG. 20 illustrates further possibilities of accommodating appliances in the storage arrangement of the invention. Thus, it will be seen that between the left pair of panels 33 of FIG. 20 are located in addition to a closet unit 39 and cabinet unit 35 an oven 96. A panel 97 is placed between the second panel 33 from the left of FIG. 20 and the second extrusion 30 from the left, and this panel 97 is formed with an opening so that the panel 97 frames the oven unit 96.

In the same way, between the right pair of panels 33 of FIG. 20 is located a refrigerator 98, and a panel 99 is placed between the right fins 33 and frames the refrigerator 98. Between the two intermediate panels 33 of FIG. 20 are located any desired combination of cabinet units, extrusions, and a counter top 34, as illustrated.

Of course, it may happen that where a series of coordinated storage units of the invention are arranged between a panel and a wall the distance between the panel and the wall is not exactly equal to the total length of the series of cabinet units, extrusions, and panel, and FIG. 21 illustrates the manner of handling this situation. Thus, referring to FIG. 21 it will be seen that between the wall 100 and the panel 33 is located a series of upper cabinet units 35 and lower cabinet units 35 assembled together with the extrusions 30 and with a counter top 34, as described above. However, it will be seen that the total length of the assembly is insufficient to extend all the way from the panel 33 to the wall 100. Therefore, in this case wood filler panels 101 which match the cabinets are located on opposite sides of the left units 35 of FIG. 21, as illustrated, these panels being fixed in any suitable way to the cabinets and extrusions as well as to the wall. FIG. 22 illustrates how such a panel 101 is located between the wall and a cabinet unit 35. Thus, it is seen that the panel 101 is located behind the extrusion 30 extending from the end wall of the cabinet 35 to the wall 100.

It is apparent from the above description that with the invention it is possible to assemble together relatively inexpensive prefabricated items in any desired combination which will enable the coordinated storage units to adapt themselves to any desired location or to any desired purpose, and it becomes unnecessary to have special storage structures made for this purpose. The feature of providing all of the cabinet and closet units with notches at their corners is of particular significance since with this arrangement the single hollow extrusion is used throughout the entire assembly to divide the several cabinet and closet units from each other as well as from the fins as well as to support the cabinet and closet units. The pairs of successive cabinet and closet units are spaced slightly from each other inasmuch as the total width of the extrusion 30 is somewhat greater than the total width of the pair of adjoining notches in which the extrusion 30 is located, so that as a result with this arrangement although the cabinet units are combined into an extremely compact assembly, and the same is true of the closet units, nevertheless no pair of successive closet or cabinet units are flush one against the other so that extreme precision in the manufacture of the closet and cabinet units is not required and at the same time the extrusions 30 by interconnecting these closet units and cabinet units and extending forwardly from the front face thereof provides an entirely unified assembly which has all of the appearance of a storage structure made especially for the particular location where it happens to be located. Of course, since only a single extrusion 30 is used throughout the entire construction not only for dividing and supporting the several cabinet and closet units but also for accommodating electrical leads, the cost is very greatly reduced because it is only necessary to manufacture one type of extrusion which serves as legs for the cabinet units as well as divider and supports for all of the closet and cabinet units and as well as for housing electrical leads.

Also, only a single type of counter top is required to be located over any series of lower cabinet units, and because of the possibility of cutting the extrusion 30 to any desired height, it is possible to arrange any lower series of cabinet units and the counter top 34 thereover at any desired height. While this height may be generally referred to as table height, the height will actually vary depending upon whether the desired use is as a desk, or as a work table, etc. Thus, it is clear that by combining the small number of basic storage units and connecting units of the invention it is possible to have the most flexible arrangement which can be adapted to any particular room, to any particular conditions, and to serve any desired purpose.

It will be understood that each of the elements described above, or two or more together, may also find a useful application in other types of storage arrangements differing from the types described above.

While the invention has been illustrated and described as embodied in storage arrangements composed of coordinated storage units, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A storage arrangement comprising, in combination, a row of cabinet units of substantially the same height located at substantially the same elevation with front faces of the several cabinet units located in a common plane, each cabinet unit having a pair of front vertically extending corners each of which is formed along its entire length with a notch so that at the adjoining front corners of a pair of successive units there are a pair of notches directed toward each other; a plurality of identical elongated divider elements respectively located in and filling each of said pairs of notches and said divider elements being fixed to said units so that the latter are interconnected with each other by said divider elements, said units having top ends located substantially at table height and said divider elements extending downwardly beyond said units to form legs which support said units; and an elongated continuous counter top extending across and covering the top ends of all of said units.

2. A storage arrangement comprising, in combination, a row of cabinet units of substantially the same height located at substantially the same elevation with front faces of the several cabinet units located in a common plane, each cabinet unit having a pair of front vertically extending corners each of which is formed along its entire length with a notch so that at the adjoining front corners of a pair of successive units there are a pair of notches directed toward each other; a plurality of identical elongated divider elements respectively located in and filling each of said pairs of notches and said divider elements being fixed to said units so that the latter are interconnected with each other by said divider elements, said units having top ends located substantially at table height and said divider elements extending downwardly beyond said units to form legs which support said units; an elongated continuous counter top extending across and covering the top ends of all of said units; and a pair of parallel panels respectively fixed to the ends of said counter top and forming between themselves a space in which the row of units is located.

3. A storage arrangement as recited in claim 1 and wherein each cabinet unit has a bottom front edge provided with a downwardly directed surface; and a strip fixed to the latter surface and extending forwardly beyond the bottom front edge of the cabinet unit to form a guard preventing striking of a mop against the bottom front edge of the cabinet unit.

4. A storage arrangement as recited in claim 1 and wherein at least one of said elongated divider elements is hollow; an electrical device supported by at least one of said cabinet units; and electrical conductors extending along the interior of at least said one of said divider elements which is hollow and connected to the electrical device to supply current thereto.

5. In a storage arrangement, in combination, a pair of cabinet units of substantially the same height located at substantially the same elevation with front faces of said units located in a common plane, each cabinet unit having a pair of front vertically extending corners each of which is formed along its entire length with a notch of polygonal cross section so that at the adjoining front corners of said pair of units there are a pair of notches directed toward each other; and a divider element of polygonal cross section located in and filling said pair of notches and extending forwardly beyond said front faces of said units, said divider elements being fixed to said units so that the latter are interconnected with each other by said divider element, and said divider element extending downwardly beyond said units to form a leg which supports said units.

References Cited in the file of this patent

UNITED STATES PATENTS

| | | |
|---|---|---|
| 1,076,116 | Hatfield | Oct. 21, 1913 |
| 1,309,579 | Konigslow | July 8, 1919 |
| 1,963,703 | Johnson | June 19, 1934 |
| 2,114,158 | Vasbinder | Apr. 12, 1938 |
| 2,239,798 | Tinnerman | Apr. 29, 1941 |
| 2,410,760 | Trachtenberg | Nov. 5, 1946 |
| 2,459,658 | Klein | Jan. 18, 1949 |
| 2,466,869 | Triller | Apr. 12, 1949 |
| 2,476,896 | Myhre | July 19, 1949 |
| 2,521,765 | White | Sept. 12, 1950 |
| 2,576,409 | Michaelis | Nov. 27, 1951 |
| 2,577,396 | Assmundsson | Dec. 4, 1951 |
| 2,609,221 | Schultz | Sept. 2, 1952 |
| 2,661,993 | Little | Dec. 8, 1953 |
| 2,662,787 | Horvay | Dec. 15, 1953 |
| 2,689,159 | Schmitz | Sept. 14, 1954 |
| 2,821,754 | Hillson | Feb. 4, 1958 |
| 2,867,488 | Guild | Jan. 6, 1959 |
| 2,905,519 | O'Neil | Sept. 22, 1959 |
| 2,907,618 | Rostau | Oct. 6, 1959 |
| 2,931,686 | Adfal | Apr. 5, 1960 |
| 2,934,181 | Weber | Apr. 26, 1960 |
| 2,965,428 | Jacobs | Dec. 20, 1960 |

FOREIGN PATENTS

| | | |
|---|---|---|
| 851,676 | Germany | Aug. 2, 1952 |
| 787,825 | Great Britain | Dec. 18, 1957 |